R. F. METCALFE.
BURNER.
APPLICATION FILED OCT. 30, 1914.

1,162,942.

Patented Dec. 7, 1915.
2 SHEETS—SHEET 1.

Witnesses
O. M. Kappler
Horace B. Fay

Inventor
Robert F. Metcalfe
By Fay and Oberlin
Attorneys

R. F. METCALFE.
BURNER.
APPLICATION FILED OCT. 30, 1914.

1,162,942.

Patented Dec. 7, 1915.
2 SHEETS—SHEET 2.

UNITED STATES PATENT OFFICE.

ROBERT F. METCALFE, OF NEW HAVEN, CONNECTICUT.

BURNER.

1,162,942.  Specification of Letters Patent.  Patented Dec. 7, 1915.

Application filed October 30, 1914. Serial No. 869,398.

*To all whom it may concern:*

Be it known that I, ROBERT F. METCALFE, a citizen of the United States, and a resident of New Haven, county of New Haven, and State of Connecticut, have invented a new and useful Improvement in Burners, of which the following is a specification, the principle of the invention being herein explained and the best mode in which I have contemplated applying that principle, so as to distinguish it from other inventions.

The subject of the present invention is a burner which is adapted primarily for use in heaters, although it can, of course, be used with slight modifications in various other apparatus. For purposes of illustration and for clearness of description, the same is here shown and will be described as adapted for use in a water heater of the "instantaneous" type. In heaters of this type, it is necessary in order to secure the desired efficiency, to secure a complete combustion of the fuel and to secure such combustion at a point as close as possible to the burner so that the combustion chamber may be as small as possible, and still maintain the fuel at its highest temperature when it first meets the heating coil. In the present device I have provided means which secure a complete combustion of the fuel at a point some distance below the heating coil and the apparatus also maintains a very strong draft in the mixing conduits which also increases the fuel efficiency. The present device has also a combustion chamber separated from the air inlet of the mixing conduits and divided therefrom by a baffle plate which directs the incoming free air to the combustion space and causes the same to absorb heat from the combustion chamber.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
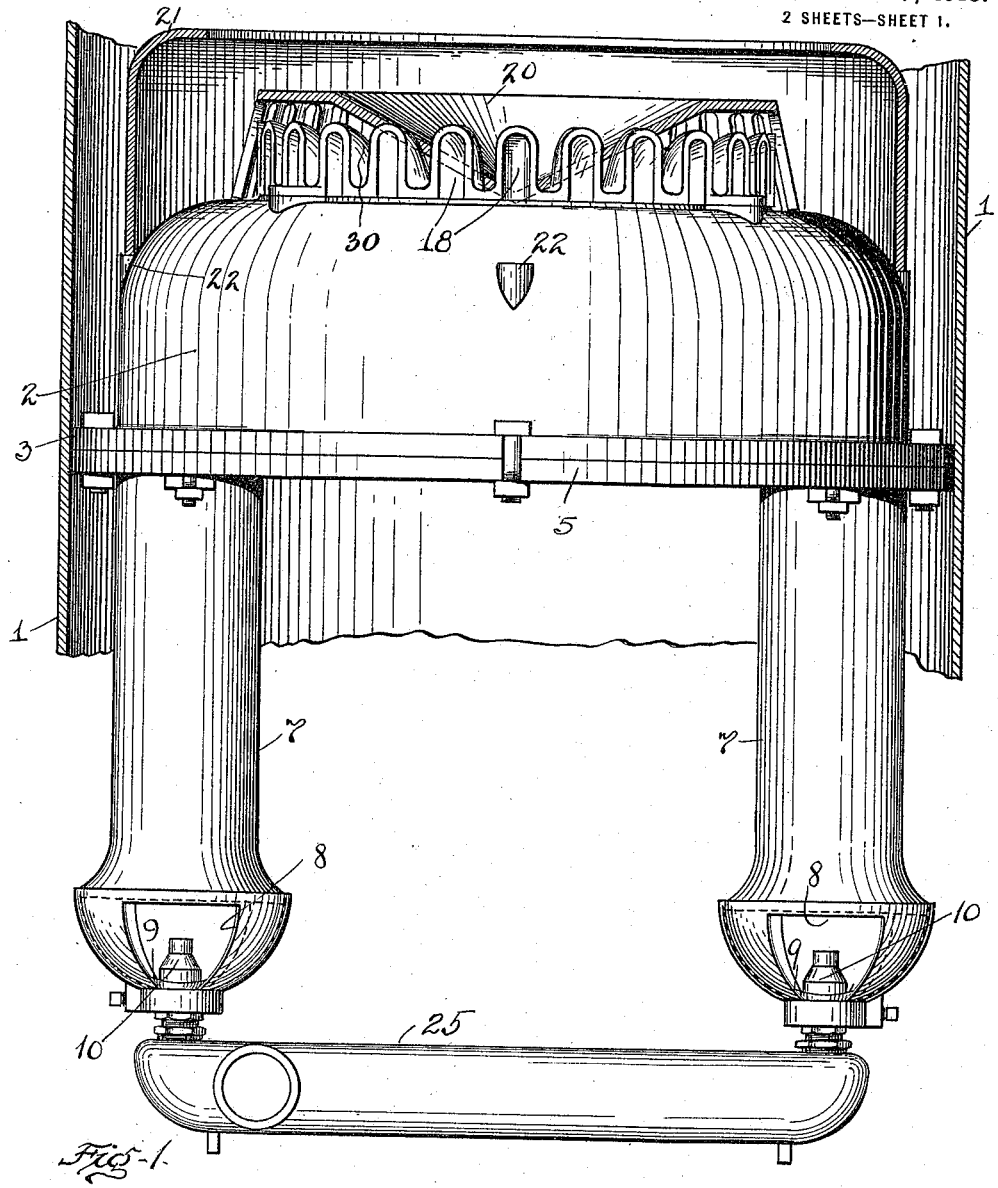
Figure 4:
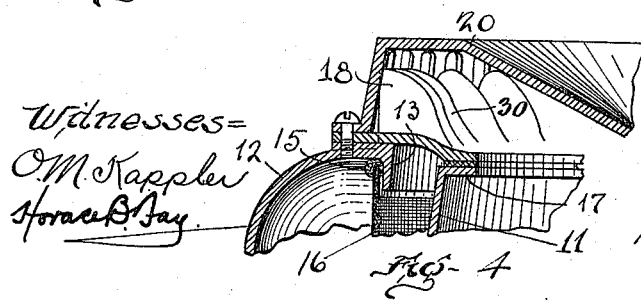
Figure 2:
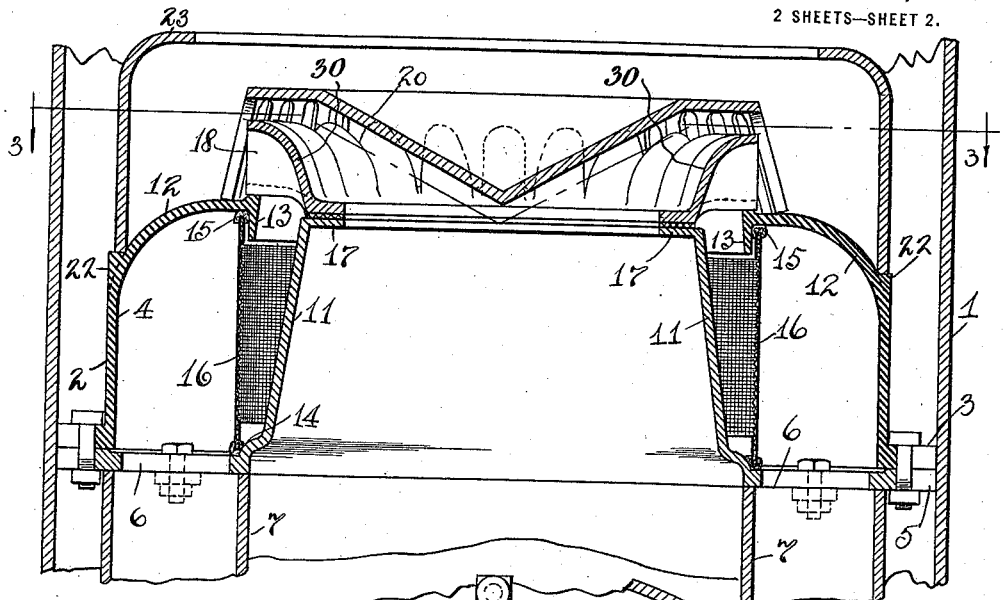
Figure 3:
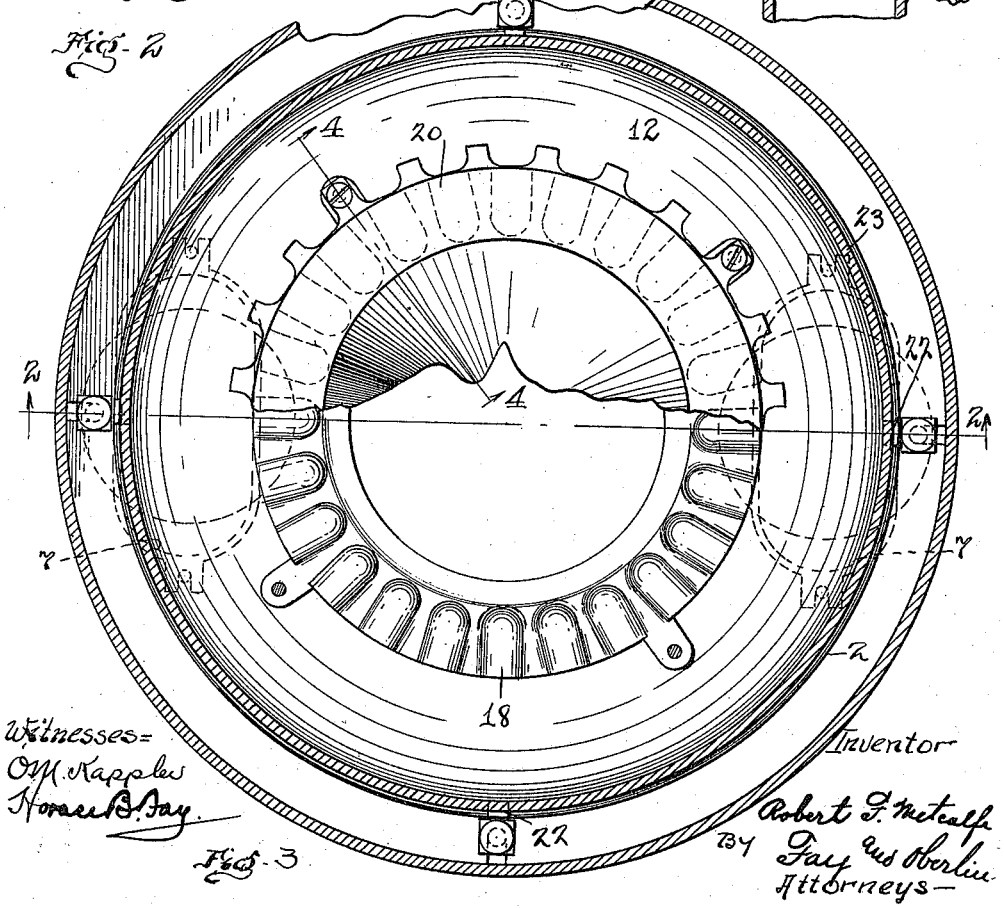

In said annexed drawings:—Figure 1 is a side elevation of the device, showing the same within a sectional casing; Fig. 2 is a central vertical section on the line 2—2, Fig. 3; Fig. 3 is a plan view of the device shown in Figs. 1 and 2, and Fig. 4 is a section on the line 4—4 in Fig. 3.

In Fig. 1 there is shown an outer casing 1 serving as the heating chamber. Within such casing there is disposed a burner casing 2 which is provided with suitable means, such for example as the flange 3, adapted to snugly engage against the inner wall of the combustion chamber, and to thus prevent the passage of air into such chamber around the burner casing. Such burner casing 2 is formed with an annular horizontally disposed chamber 4, closed at its lower end by means of an annular plate 5 provided with one or more apertures 6 at which points may be attached mixing conduits 7. Each such mixing conduit consists of a vertically disposed pipe provided at its lower end with lateral apertures 8 the area of which is controlled by means of a rotatable slide or valve 9. Each such conduit 7 is apertured at its lower end and inserted in such aperture is a gas supply nozzle 10 attached to a gas supply conduit 25, which is connected to each of the several mixing conduits. The gas is primarily mixed with air in the mixing conduit 7 and the supply of air admitted to such conduits can be regulated by the adjustment of the valve slides 9, in the lower ends of such conduits.

The annular chamber 4 formed in the burner casing 2 has an inwardly inclined inner wall 11 and a rounded outer wall 12. A downwardly extending flange 13 is formed at the inner side of the rounded top of the burner casing, such flange 13 being substantially vertically above the inner edge of the lower part of such casing. Disposed about the flange 13 and the inner edge 14 of the lower part of the casing, is an open framework 15 upon which is attached in any suitable manner, a gauze screen 16.

The inner wall 11 of the burner casing is provided at its top with an inwardly extending flange 17 and upon such flange there is mounted a distributing burner plate 30 provided with a continuous line or row of horizontally directed openings forming nozzles through which the gas flames issue into the combustion chamber. The form of such openings is best shown in Fig. 1 from which it will be seen that the edge of such burner plate is provided with corrugations, each corrugation being hollowed out on its lower side, thus forming a passage 18 which connects with the chamber 4 in the burner casing. By thus providing a number of variously directed and diverging flames each flame is made individual, and complete and separate combustion is secured for each flame.

The burner casing 2 is open at its center, thus providing an auxiliary air inlet and such air is directed past and around each semicircular jet or nozzle in the burner plate by means of a baffle plate 20, the form of which is best shown in Fig. 2. This plate is attached or supported by any suitable means, preferably spaced from the burner plate and is set but a slight distance above the top of the jets in the burner plate. In this way the air is made to rush past and around each opening in the burner plate and auxiliary air is thus adequately supplied to each flame, thus securing a complete combustion of the flames individually. The baffle plate 20 is exposed to the radiant heat of the combustion and on becoming heated this plate transmits heat to the free air entering past its lower side, in this way warming the auxiliary air supply. The importance of this individual combustion is that in this way the large amount of gas which is used is broken up into a large number of flames, each flame being relatively small. By securing a complete and separate combustion of each flame, the height of the same is very much less than the height of the flame which would be produced were all the gas allowed to mingle and form in effect a single flame. Thus, for example, in the present burner complete combustion of the fuel is secured at a point only about an inch or two above the top of the baffle plate.

In order to concentrate and direct the rising gases and to prevent the same from striking the outer casing and losing their heat, I provide a second baffle plate 21 mounted upon suitable lugs 22 on the sides of the burner casing. At its top the second baffle plate 21 is provided with an inwardly curved flange 23 which directs the products of combustion toward the center of the burner casing toward which point the flames pass upwardly through the heating coils, which are not shown. By thus providing a number of small individual flames and securing complete combustion at a low point in the combustion chamber, the upward movement of the gas is very fast, thus producing a very strong draft through the burner casing and consequently drawing in an adequate amount of air around the openings in the burner plate and forcing the mixing conduits to draw their maximum amount of air, and in this way securing a perfect combustion of the air and gas. It is first, by preventing free admission of air at atmospheric temperature (which, if allowed, would greatly retard combustion) and second, by drawing in an adequate amount of air around the individual opening, and preheating this air by contact with the baffle plate, that perfect combustion of the gas is obtained. These desired results are obtained in my device by initially directing the individual flames horizontally properly distributing the auxiliary air to the outlets of the burner passages 18. It will be noticed that this auxiliary air is practically admitted through the burner itself, the contour of the burner openings being such that the additional air is supplied to, and mixed with, each individual flame.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with an outer casing forming a heating chamber, of a burner casing mounted within and in contact with the wall of said outer casing, said burner casing having an annular chamber therein open adjacent to its top, a gauze screen interposed in such chamber, a mixing conduit connected to such annular chamber at its bottom, and means adapted to break up the gas and air issuing from the open top of such annular chamber into a plurality of individual jets, and to cause complete and separate combustion of each jet.

2. The combination with an outer casing forming a heating chamber, of a burner casing mounted within and in contact with the wall of said outer casing, said burner casing having an annular chamber therein open adjacent to its top, a gauze screen interposed in such chamber, a mixing conduit connected to such annular chamber at its bottom, and a distributing plate mounted on said burner casing and having a plurality of variously directed openings, each adapted to produce an individual flame.

3. The combination with an outer casing forming a heating chamber, of a burner casing mounted within and in contact with the wall of said outer casing, said burner casing having an annular chamber therein open adjacent to its top, a gauze screen interposed in such chamber, a mixing conduit connected to such annular chamber at its bottom, and a distributing plate mounted on said burner casing and formed with a continuous row of outwardly directed, horizontally discharging openings, each adapted to produce an individual and separate flame.

4. The combination with an outer casing forming a heating chamber, of a burner casing mounted within and in contact with the wall of said outer casing, said burner casing having an annular chamber therein open adjacent to its top, a mixing conduit connected to such annular chamber at its bottom, a distributing plate mounted on said burner casing and formed with a continuous row of outwardly directed, horizontally discharging openings, each adapted to produce an individual and separate flame, and means for supplying additional air to each of such openings in said distributing plate.

5. The combination with an outer casing forming a heating chamber, of a burner casing mounted within and in contact with the wall of said outer casing, said burner casing having an annular chamber therein open adjacent to its top, and having an aperture in its center, a mixing conduit connected to such annular chamber at its bottom, a distributing plate mounted on said burner casing and formed with a continuous row of outwardly directed, horizontally discharging openings, each adapted to produce an individual and separate flame, and means adapted to direct the auxiliary air entering such central aperture in said burner casing past such openings in said distributing plate.

6. The combination with an outer casing forming a heating chamber, of a burner casing mounted within and in contact with the wall of said outer casing, said burner casing having an annular chamber therein open adjacent to its top, and having an aperture in its center, a mixing conduit connected to such annular chamber at its bottom, a distributing plate mounted on said burner casing and formed with a continuous row of outwardly directed, horizontally discharging openings, each adapted to produce an individual and separate flame, and a baffle plate disposed above said burner casing and said distributing plate, said baffle plate being formed and positioned to direct the auxiliary air entering such central aperture in said burner casing past such openings in said distributing plate.

7. The combination with an outer casing forming a heating chamber, of a burner casing mounted within and in contact with the wall of said outer casing, said burner casing having an annular chamber therein open adjacent to its top, and having an aperture in its center, a mixing conduit connected to such annular chamber at its bottom, a distributing plate mounted on said burner casing and formed with a continuous row of individual, outwardly directed and horizontally discharging openings, said plate being corrugated to correspond to such openings, and a baffle plate disposed above said burner casing and said distributing plate, said baffle plate being formed and positioned to direct the auxiliary air entering such central aperture in said burner casing past such openings in such distributing plate, thereby producing complete and separate combustion of the column of gas and air issuing from each of such openings.

8. The combination with an outer closed casing forming a heating chamber, of a suitable burner casing having a plurality of burner openings and being mounted within and in contact with the wall of said outer casing, a mixing conduit adapted to supply mixed gas and air to said burner casing, said burner casing having an opening for auxiliary air, and means adapted to direct the auxiliary air past and around each of the burner openings in said burner casing.

9. The combination with an outer closed casing forming a heating chamber, of a suitable burner casing having a plurality of burner openings and being mounted within and in contact with the wall of said outer casing, a mixing conduit adapted to supply mixed gas and air to said burner casing, said burner casing having an opening for auxiliary air, and means adapted to preheat the auxiliary air and to direct the same past and around each of the burner openings in said burner casing.

10. The combination with an outer closed casing forming a heating chamber, of a suitable burner casing having a plurality of burner openings and being mounted within and in contact with the wall of said outer casing, a mixing conduit adapted to supply mixed gas and air to said burner casing, said burner casing having an opening for auxiliary air and a plurality of individual horizontally directed burner openings, and a baffle plate adapted to preheat and direct the auxiliary air past and around each of such burner openings.

11. The combination with an outer casing forming a heating chamber, of a mixing conduit for gas and air, a suitable burner casing mounted within and in contact with the wall of said outer casing, thereby separating the combustion chamber from said mixing tube, said burner casing having an annular chamber therein open adjacent to its top and an opening at its bottom connected to said mixing tube, and means adapted to break up the gas and air issuing from the open top of such annular chamber into a plurality of individual jets, and to cause complete and separate combustion of each jet, said burner casing having an additional opening in its bottom for the admission of auxiliary air.

Signed by me, this 22 day of October, 1914.

ROBERT F. METCALFE.

Attested by—
HARRY F. CUMMINGS,
FRANK E. SCHNELLER.

Copies of this patent may be obtained for five cents each, by addressing the "Commissioner of Patents, Washington, D. C."